US009897247B2

United States Patent
Lu et al.

(10) Patent No.: US 9,897,247 B2
(45) Date of Patent: Feb. 20, 2018

(54) POSITIONING DEVICE

(71) Applicant: ScienBiziP Consulting (Shenzhen) Co., Ltd., Shenzhen (CN)

(72) Inventors: Li-Chin Lu, New Taipei (TW); Jian-Hua Xiang, Shenzhen (CN); Li Ao, Shenzhen (CN)

(73) Assignee: ScienBiziP Consulting(Shenzhen)Co.,Ltd., Shenzhen (CN)

( * ) Notice: Subject to any disclaimer, the term of this patent is extended or adjusted under 35 U.S.C. 154(b) by 153 days.

(21) Appl. No.: 14/688,815

(22) Filed: Apr. 16, 2015

(65) Prior Publication Data

US 2016/0123520 A1   May 5, 2016

(30) Foreign Application Priority Data

Oct. 31, 2014   (CN) .......................... 2014 1 0603555

(51) Int. Cl.

| | |
|---|---|
| *F16M 11/04* | (2006.01) |
| *F16M 11/18* | (2006.01) |
| *B23P 19/04* | (2006.01) |
| *F16M 11/42* | (2006.01) |

(52) U.S. Cl.
CPC ............ *F16M 11/041* (2013.01); *B23P 19/04* (2013.01); *F16M 11/048* (2013.01); *F16M 11/18* (2013.01); *F16M 11/425* (2013.01); *Y10T 29/53961* (2015.01)

(58) Field of Classification Search
CPC ......... Y10T 29/53961; Y10T 29/53974; Y10T 29/53991; Y10T 29/5361; F16M 11/043; F16M 11/18; F16M 11/041; F16M 11/048; B23P 19/04; B25B 5/003; B25B 5/145

USPC .............. 29/281.1, 283, 281.4, 428; 269/55, 269/289 R

See application file for complete search history.

(56) References Cited

U.S. PATENT DOCUMENTS

| | | | |
|---|---|---|---|
| 6,192,570 B1 * | 2/2001 | Traver ................ | B60R 16/0239 174/50.5 |
| 6,539,600 B2 * | 4/2003 | Wu ......................... | B23P 19/02 269/234 |
| 7,971,863 B2 * | 7/2011 | Chen ........................ | B25B 5/06 269/289 R |
| 8,575,791 B2 * | 11/2013 | Jywe ................... | B23K 26/0853 108/138 |
| 9,228,271 B2 * | 1/2016 | Liu ....................... | C25D 11/005 |

(Continued)

*Primary Examiner* — Christopher M Koehler
*Assistant Examiner* — Mahdi H Nejad
(74) *Attorney, Agent, or Firm* — ScienBiziP, P.C.

(57) ABSTRACT

A product positioning device includes a support, a first guide rail, a second guide rail, a support platform, a latching device, and a driving device. The first guide rail and the second guide rail are positioned on the support. The support platform is configured to receive a product to be positioned. The support platform is movable to an end of the first guide rail. The latching device is movable to a position holding the product to be positioned against the support platform. The driving device is movable to a position nearer the support platform. The driving device is further slidably engaged with the second guide rail. The driving device moves to the driving device position as the support platform moves to the end of the first guide rail, and the latching device moves to the latching device position as the driving device moves to the driving device position.

14 Claims, 3 Drawing Sheets

(56) References Cited

U.S. PATENT DOCUMENTS

| | | | | |
|---|---|---|---|---|
| 9,449,748 B2* | 9/2016 | Lu | | H01F 7/206 |
| 2002/0129479 A1* | 9/2002 | Chen | | B25B 27/00 |
| | | | | 29/239 |
| 2003/0106441 A1* | 6/2003 | Chiang | | B21D 28/265 |
| | | | | 100/215 |
| 2005/0000075 A1* | 1/2005 | Gunshinan | | A63B 60/42 |
| | | | | 29/407.01 |
| 2006/0101633 A1* | 5/2006 | Lee | | G02F 1/1303 |
| | | | | 29/464 |
| 2006/0244189 A1* | 11/2006 | Lu | | H05K 5/0013 |
| | | | | 269/55 |
| 2006/0248711 A1* | 11/2006 | Lu | | H05K 5/0013 |
| | | | | 29/760 |
| 2007/0022895 A1* | 2/2007 | Lee | | H01L 51/524 |
| | | | | 101/494 |
| 2007/0294882 A1* | 12/2007 | Tsai | | H05K 7/20 |
| | | | | 29/729 |
| 2008/0158807 A1* | 7/2008 | Lu | | G06F 1/183 |
| | | | | 361/807 |
| 2009/0139083 A1* | 6/2009 | Stepanek | | G01F 23/00 |
| | | | | 29/701 |
| 2009/0165247 A1* | 7/2009 | Lu | | G06F 1/1681 |
| | | | | 16/337 |
| 2010/0107377 A1* | 5/2010 | Li | | B25B 1/103 |
| | | | | 24/457 |
| 2010/0177468 A1* | 7/2010 | Liu | | H01M 2/1066 |
| | | | | 361/679.01 |
| 2010/0294042 A1* | 11/2010 | Zhang | | G01N 15/00 |
| | | | | 73/818 |
| 2010/0300176 A1* | 12/2010 | Zhang | | G01N 35/00 |
| | | | | 73/7 |
| 2011/0024962 A1* | 2/2011 | Zhang | | B25B 5/06 |
| | | | | 269/107 |
| 2011/0252935 A1* | 10/2011 | Welsh | | G01N 1/08 |
| | | | | 83/37 |
| 2012/0036688 A1* | 2/2012 | Fang | | B21J 15/10 |
| | | | | 29/243.53 |
| 2012/0049037 A1* | 3/2012 | Chen | | B25J 15/04 |
| | | | | 248/550 |
| 2012/0102731 A1* | 5/2012 | Guo | | H05K 13/0015 |
| | | | | 29/832 |
| 2012/0161378 A1* | 6/2012 | Wen | | B23K 31/02 |
| | | | | 269/56 |
| 2012/0181737 A1* | 7/2012 | Yang | | B25B 5/003 |
| | | | | 269/287 |
| 2012/0291247 A1* | 11/2012 | Wang | | H01Q 1/243 |
| | | | | 29/281.1 |
| 2012/0299234 A1* | 11/2012 | Tang | | B23Q 3/06 |
| | | | | 269/134 |
| 2012/0304432 A1* | 12/2012 | Wang | | G06F 1/1626 |
| | | | | 29/281.3 |
| 2013/0145870 A1* | 6/2013 | Huang | | B25B 5/006 |
| | | | | 74/29 |
| 2013/0273477 A1* | 10/2013 | Morohashi | | H01L 21/67742 |
| | | | | 430/325 |
| 2013/0341848 A1* | 12/2013 | Woods | | B25B 5/02 |
| | | | | 269/37 |
| 2014/0007395 A1* | 1/2014 | Hemingway | | B25B 25/005 |
| | | | | 29/281.1 |
| 2014/0013559 A1* | 1/2014 | Yuan | | B23P 19/04 |
| | | | | 29/281.1 |
| 2014/0064888 A1* | 3/2014 | Chen | | H01L 21/67766 |
| | | | | 414/280 |
| 2014/0118725 A1* | 5/2014 | Kuo | | B25B 1/06 |
| | | | | 356/124 |
| 2014/0167343 A1* | 6/2014 | Lu | | B25B 5/003 |
| | | | | 269/60 |
| 2014/0182121 A1* | 7/2014 | Guo | | B23P 19/04 |
| | | | | 29/714 |
| 2014/0187069 A1* | 7/2014 | Li | | H01R 43/26 |
| | | | | 439/160 |
| 2014/0201965 A1* | 7/2014 | Aldred | | B01L 9/52 |
| | | | | 29/407.1 |
| 2015/0001777 A1* | 1/2015 | Huang | | B23Q 1/621 |
| | | | | 269/73 |
| 2015/0028974 A1* | 1/2015 | Lu | | H01F 7/206 |
| | | | | 335/290 |

\* cited by examiner

POSITIONING DEVICE

CROSS-REFERENCE TO RELATED APPLICATIONS

This application claims priority to Chinese Patent Application No. 201410603555.5 filed on Oct. 31, 2014, the contents of which are incorporated by reference herein.

FIELD

The subject matter herein generally relates to positioning devices, and particularly, to a positioning device capable of positioning a product.

BACKGROUND

Before testing a quantity or a function of a product, a positioning device may be employed to position the product at a desired position.

BRIEF DESCRIPTION OF THE DRAWINGS

Implementations of the present technology will now be described, by way of example only, with reference to the attached figures.

DETAILED DESCRIPTION

Figure 1:
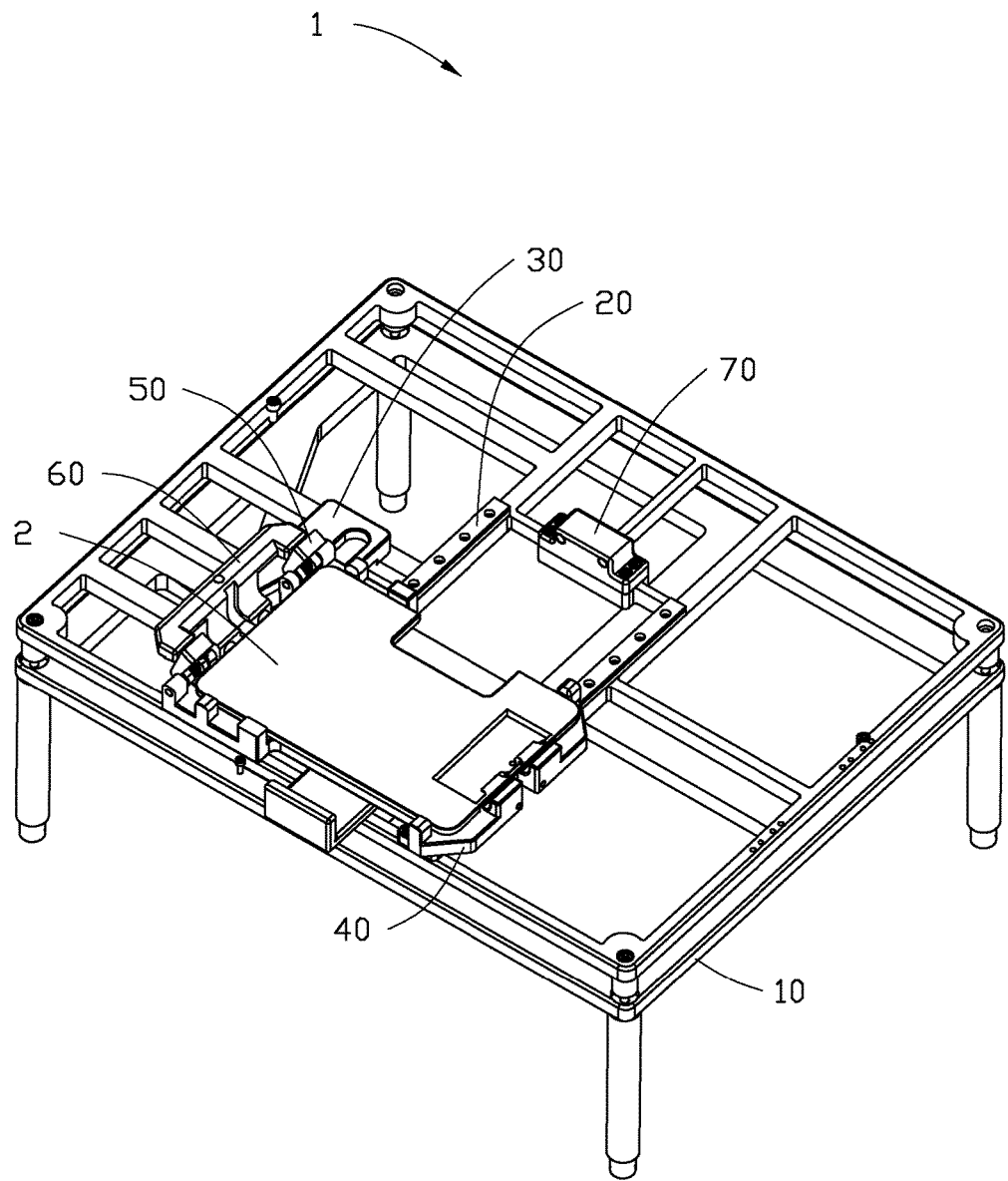
FIG. 1 is an isometric view showing an embodiment of a positioning device and a product.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

The term "comprising" means "including, but not necessarily limited to"; it specifically indicates open-ended inclusion or membership in a so-described combination, group, series and the like.

Embodiments of the present disclosure will be described in relation to the accompanying drawings.

Figure 2:
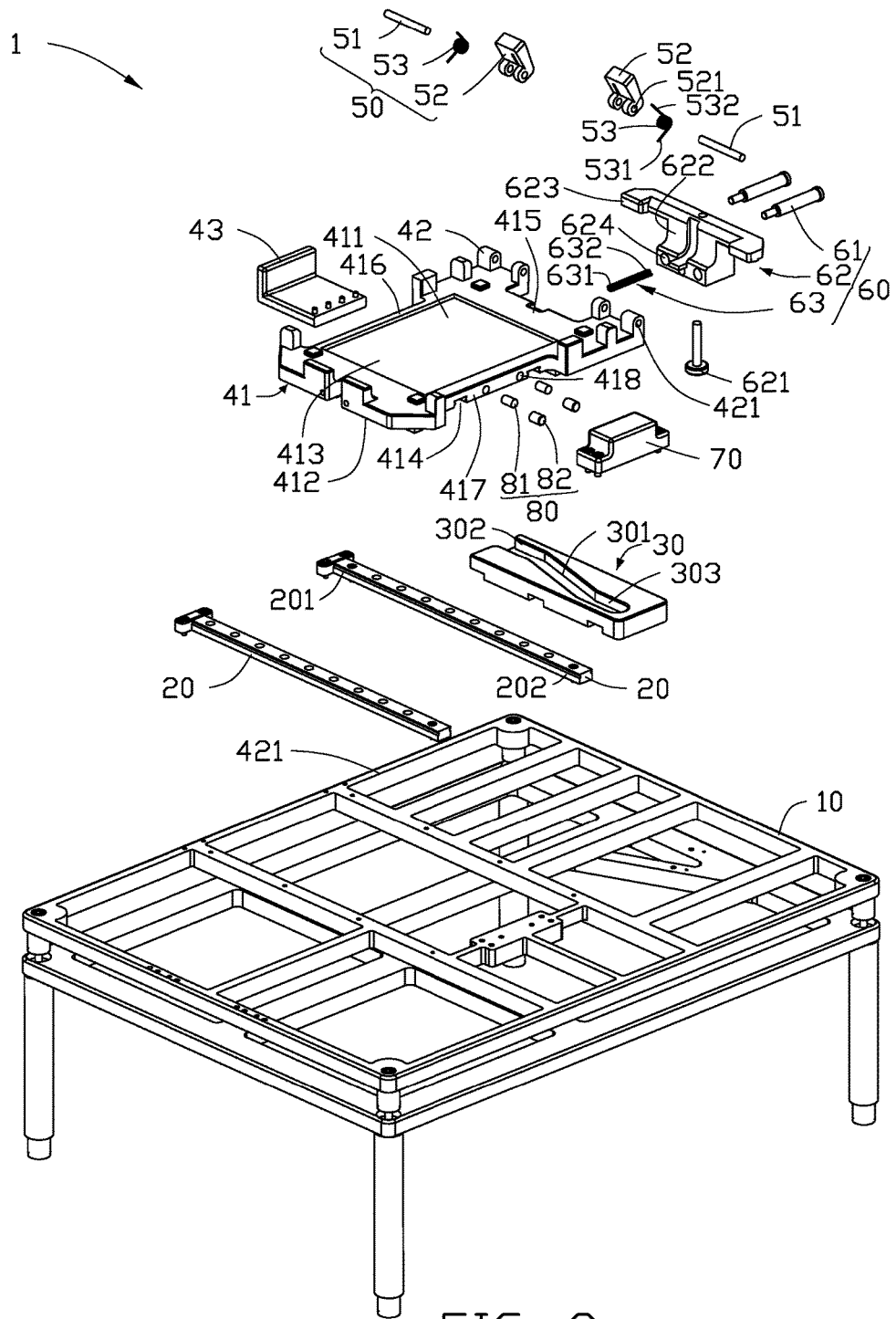
FIG. 2 is an exploded, isometric view showing the positioning device of FIG. 1.

FIGS. 1-2 illustrate an embodiment of a positioning device 1. The positioning device 1 can include a support 10, at least one first guide rail 20, a second guide rail 30, a support platform 40, at least one latching device 50, and a driving device 60. The at least one first guide rail 20 and the second guide rail 30 can be positioned on the support 10. The support platform 40 can be configured to receive a product to be positioned 2. The support platform 40 can be slidably engaged with the at least one first guide rail 20 and movable along the at least one first guide rail 20. The at least one latching device 50 can be rotatably connected to the support platform 40. The driving device 60 can be slidably attached to the support platform 40, and can be movable. The driving device 60 can be further slidably engaged with the second guide rail 30. When the support platform 40 moves along the first guide rail 20, the support platform 40 can move the driving device 60 along the second guide rail 30, and move the driving device 60 until the driving device 60 moves the at least one latching device 50 to hold the product to be positioned 2 against the support platform 40, thereby positioning the product to be positioned 2.

In the embodiment, two first guide rails 20 can be taken as an example. Each first guide rail 20 and the second guide rail 30 can be parallel with each other. Each first guide rail 20 can include a first end 201 and a second end 202 opposite to the first end 201. The second guide rail 30 can be positioned to allow movement along the second guide rail 30, at least in part, along a direction substantially parallel to movement along the at least one first guide rail 20. The second guide rail 30 can define a guiding groove 301. The guiding groove 301 can include a first end 302 and a second end 303 opposite to the first end 302. The guiding groove 301 can extend toward each first guide rail 20 in a horizontal surface from the first end 302 of the guiding groove 301 to the second end 303 of the guiding groove 301. In an alternative embodiment, the guiding groove 301 can be replaced with a guiding rib. In an alternative embodiment, the guiding groove can be defined at the each first guide rail 20, and extend toward the second guide rail 30 in a horizontal surface from the first end of the guiding groove to the second end of the guiding groove. In another alternative embodiment, each first guide rail 20 and the second guide rail 30 can have the guiding groove or a guiding rib, the guiding groove or the guiding rib of each first guide rail 20 can extend toward the guiding groove or the guiding rib of the second guide rail 30 in a horizontal surface from the first end of the guiding groove or the guiding rib of each first guide rail 20 to the second end of the guiding groove or the guiding rib of each first guide rail 20.

In the embodiment, the support platform 40 can include a base plate 41, at least one pair of plugs 42, and a handle 43. The base plate 41 can include a first surface 411 and a second surface 412 opposite to the first surface 411. In the embodiment, the first surface 411 of the base plate 41 can be an upper surface of the base plate 41, and the second surface 412 of the base plate 41 can be a lower surface of the base plate 41. The base plate 41 can define a receiving groove 413. The receiving groove 413 can extend from the first surface 411 of the base plate 41 to the second surface 412 of the base plate 41. The receiving groove 413 can be configured to receive the product to be positioned 2. The base plate 41 can further define at least one positioning groove 414. In the embodiment, two positioning grooves 414 can be taken as an example. Each positioning groove 414 can be slidably engaged with a corresponding first guide rail 20, thus the base plate 41 can be movable along the first guide rails 20.

In the embodiment, the base plate 41 can include a first end 415, a second end 416, and a third end 417. The first end 415 of the base plate 41 can extend between the second end 416 of the base plate 41 and the third end 417 of the base plate 41. The second end 416 of the base plate 41 can be opposite to the third end 417 of the base plate 41. The second end 416 of the base plate 41 can be adjacent to and jointed to the first end 201 of each first guide rail 20 with respect to the first end 415 of the base plate 41. The third end 417 of the base plate 41 can be adjacent to and jointed to the second end 202 of each first guide rail 20 with respect to the first end

415 of the base plate 41. In the embodiment, two pairs of plugs 42 can be taken as an example. Each pair of plugs 42 can protrude from the first end 415 of the base plate 41. The two plugs 42 in each pair can be spaced from each other. Each plug 42 can define a first through hole 421. The handle 43 can protrude from the second end 416 of the base plate 41, and can be operated to move the base plate 41. The third end 417 of the base plate 41 can define at least one receiving hole 418. In the embodiment, two receiving holes 418 can be taken as an example.

In the embodiment, two latching devices 50 can be taken as an example. Each latching device 50 can be movable from a first position away from the support platform 40 to a second position holding the product to be positioned 2 against the support platform 40. Each latching device 50 can be received between the two plugs 42 in a corresponding pair. Each latching device 50 can include a shaft 51, a pressing plate 52, and an elastic member 53. Each pressing plate 52 can define a second through hole 521. Each shaft 51 can pass through a corresponding first through hole 421 and a corresponding second through hole 521, thus each pressing plate 52 can be rotatably connected to the base plate 41 via the corresponding shaft 51 and the corresponding pair of the plugs 42. Each elastic member 53 can be pivoted on a corresponding shaft 51. Each elastic member 53 can include a first end 531 and a second end 532 opposite to the first end 531. The first end 531 of each elastic member 53 can be fixed to or resist the support platform 40. In the embodiment, the first end 531 of each elastic member 53 can be fixed to or resist the base plate 41. In an alternative embodiment, the first end 531 of each elastic member 53 can be fixed to or resist a corresponding plug 42. The second end 532 of each elastic member 53 can be fixed to or resist the pressing plate 52. Each elastic member 53 can resile to retain a corresponding pressing plate 52 to the first driving device position away from the support platform 40 when no force is exerted on the corresponding pressing plate 52.

In the embodiment, the driving device 60 can be movable from a first position away from the support platform 40 to a second position nearer the support platform 40. The driving device 60 can include at least one guiding member 61 and a resisting device 62. In the embodiment, two guiding members 61 can be taken as an example. In the embodiment, each guiding member 61 can protrude from the first end 415 of the base plate 41 and extend away from the first end 415 of the base plate 41. The resisting device 62 can include a wheel 621, a supporting member 622, and at least one resisting member 623. The wheel 621 can be fixed to the supporting member 622, and received in the guiding groove 301 of the second guide rail 30. In the embodiment, the wheel 621 can be fixed to the supporting member 622 via a supporting rod. The supporting member 622 can be slidably engaged with the guiding groove 301 via the wheel 621 and movable along the guiding groove 301 via the wheel 621. The supporting member 622 can define at least one third through hole 624. In the embodiment, two third through holes 624 can be taken as an example. Each guiding member 61 can pass through a corresponding third through hole 624 of the supporting member 622, thus the supporting member 622 can be moved by the base plate 41 to move along the second guide rail 30, and can move from the first position away from the first end 415 of the base plate 41 to the second position nearer the first end 415 of the base plate 41 along the guiding members 61. In the embodiment, two resisting members 623 can be taken as an example. Two resisting members 623 can protrude from opposite sides of the supporting member 622. In the embodiment, a vertical distance between the resisting members 623 and the base plate 41 can be greater than a vertical distance between the pressing plate 52 and the base plate 41.

Figure 3:
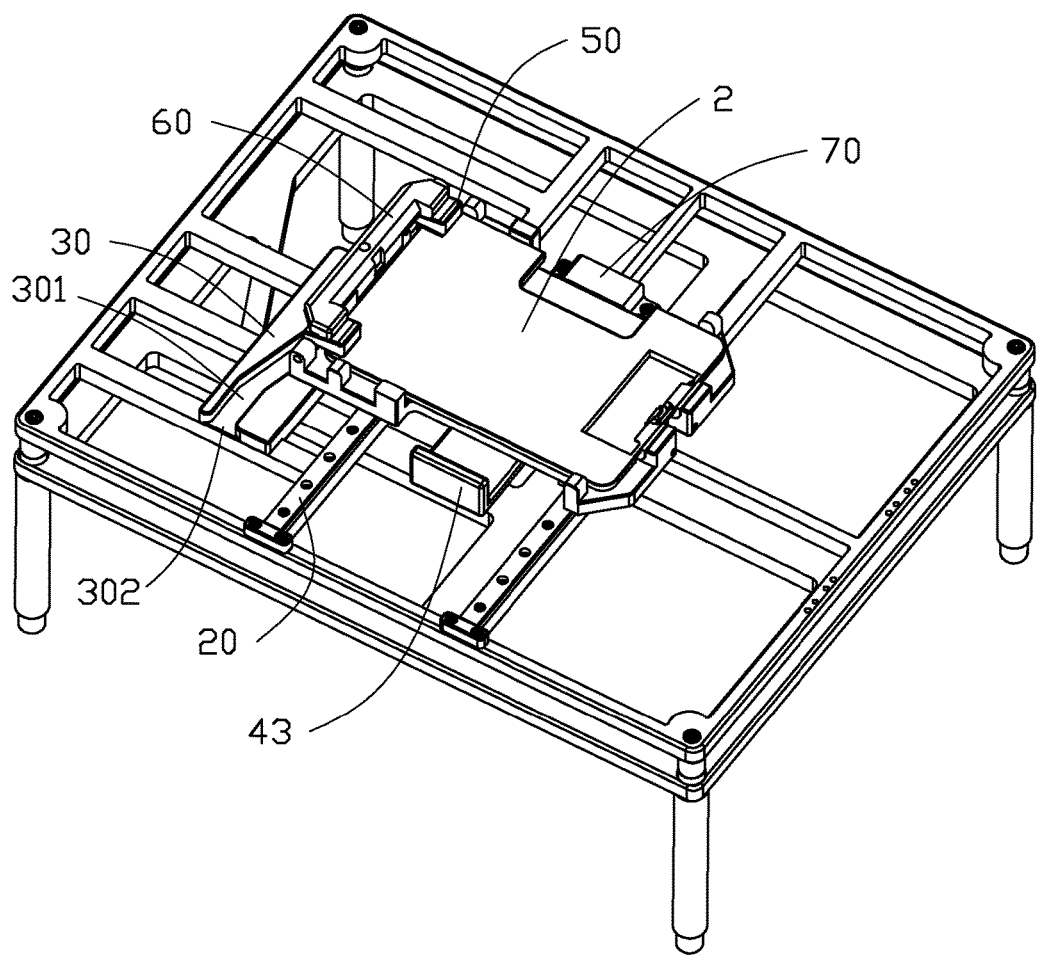
FIG. 3 is an isometric view showing the positioning device of FIG. 1 having positioned the product.

When positioning, the product to be positioned 2 can be placed into the receiving groove 413. The handle 43 can be pushed to move the base plate 41 from the first end 201 of each first guide rail 20 to the second end 202 of each first guide rail 20. The supporting member 622 can be moved by the base plate 41 along the guiding groove 301 via the wheel 621. Because the guiding groove 301 can extend toward each first guide rail 20 in a horizontal surface from the first end 302 of the guiding groove 301 to the second end 303 of the guiding groove 301, the supporting member 622 can be moved from the first driving device position away from the support platform 40 to the second driving device position nearer the support platform 40. The supporting member 622 can bring the resisting members 623 to move each pressing plate 52 from the first latching device position away from the support platform 40 to the second latching device position holding the product to be positioned 2 against the support platform 40 (see FIG. 3).

In the embodiment, the positioning device 1 can further include a limiting member 70. The limiting member 70 can be fixed on the support 10, and be arranged at a side of the second end 202 of the first guide rails 20. The limiting member 70 can be directly opposite to the base plate 41. The limiting member 70 can be configured to limit the movement range of the base plate 41.

In the embodiment, the driving device 60 can further include a resiling member 63. The resiling member 63 can be arranged between the base plate 41 and the supporting member 622. The resiling member 63 can include a first end 631 and a second end 632 opposite to the first end 631. The first end 631 of the resiling member 63 can be fixed to the first end 415 of the base plate 41, and the second end 632 of the resiling member 63 can be fixed to the supporting member 622. The resiling member 63 can be configured to resile to move the supporting member 622 to the first driving device position away from the support platform 40 until the supporting member 622 moves the support platform 40 to the first end 201 of the first guide rails 20. In the embodiment, the resiling member 63 can be a coil spring.

In the embodiment, the positioning device 1 can further include at least one fixing device 80. In the embodiment, two fixing devices 80 can be taken as an example. Each fixing device 80 can include a first fixing member 81 and a second fixing member 82. Each first fixing member 81 can be fixed in a corresponding receiving hole 418. Each second fixing member 82 can be fixed to the limiting member 70. The second fixing members 82 can be configured to engage with the first fixing members 81 to attract the base plate 41 to the limiting member 70 when the second fixing members 82 contact the first fixing members 81. In the embodiment, the second fixing members 82 can engage with the first fixing members 81 via a magnetic force between the second fixing members 82 and the first fixing members 81. In the embodiment, each first fixing member 81 can be a magnet, and each second fixing member 82 can be made of a ferromagnetic material or be a magnet whose polarity is different from a polarity of a corresponding first fixing member 81. In other embodiments, each first fixing member 81 can be made of a ferromagnetic material or be a magnet, and each second fixing member 82 can be a magnet whose polarity is different from a polarity of a corresponding first fixing member 81.

The embodiments shown and described above are only examples. Even though numerous characteristics and advantages of the present technology have been set forth in the foregoing description, together with details of the structure and function of the present disclosure, the disclosure is illustrative only, and changes may be made in the detail, including in matters of shape, size and arrangement of the parts within the principles of the present disclosure up to, and including, the full extent established by the broad general meaning of the terms used in the claims.

What is claimed is:

1. A product positioning device comprising:
   a support;
   at least one first guide rail positioned on the support, the at least one first guide rail having a first end and a second end opposite the first end;
   a support platform configured to receive a product to be positioned, the support platform slidably engaged with the at least one first guide rail and movable from the first end of the at least one first guide rail to the second end of the at least one first guide rail;
   at least one latching device rotatably connected to the support platform, the at least one latching device movable from a first position away from the support platform to a second position holding the product to be positioned against the support platform;
   a second guide rail positioned on the support, the second guide rail positioned to allow a movement along the second guide rail, at least in part, along a direction substantially parallel to a movement along the at least one first guide rail; and
   a driving device slidably attached to the support platform and movable from a first position away from the support platform to a second position nearer the support platform, the driving device being further slidably engaged with the second guide rail;
   wherein, when the product to be positioned is received on the support platform, the support platform is moved from the first end of the at least one first guide rail to the second end of the at least one first guide rail, moving the driving device along the second guide rail with the second guide rail being configured to move the driving device from the first driving device position to the second driving device position as the support platform moves from the first end of the at least one first guide rail to the second end of the at least one first guide rail; and
   wherein, as the driving device moves to the second driving device position, the driving device moves the at least one latching device from the first latching device position away from the support platform to the second latching device position holding the product to the positioned against the support platform.

2. The positioning device as described in claim 1, wherein:
   the at least one latching device comprises at least one pressing plate and at least one elastic member, the at least one pressing plate is rotatably connected to the support platform, the at least one pressing plate is moved by the driving device from the first latching device position away from the support platform to the second latching device position holding the product to be positioned against the support platform as the driving device is moved from the first driving device position away from the support platform to the second driving device position nearer the support platform; the at least one elastic member comprises a first end and a second end opposite to the first end, the first end of the at least one elastic member is fixed to or resists the support platform and the second end of the at least one elastic member is fixed to or resists the at least one pressing plate, the at least one elastic member is configured to resile to retain the at least one pressing plate to the first driving device position away from the support platform when no force is exerted on the at least one pressing plate.

3. The positioning device as described in claim 2, wherein:
   the support platform comprises at least one pair of plugs, the two plugs in the at least one pair are spaced from each other, each plug defines a first through hole, the at least one latching device is received between the two plugs in the at least one pair; and
   the at least one latching device further comprises a shaft, the at least one pressing plate defines a second through hole, the shaft passes through the first through hole and the second through hole.

4. The positioning device as described in claim 3, wherein the support platform comprises a base plate and a handle, the base plate comprises a first end, a second end and a third end, the first end of the base plate is extended between the second end of the base plate and the third end of the base plate, the second end of the base plate is opposite to the third end of the base plate, the second end of the base plate is adjacent to the first end of the at least one first guide rail with respect to the first end of the base plate, the at least one pair of plugs protrudes from the first end of the base plate, the handle protrudes from the second end of the base plate and is configured to be operated to move the base plate.

5. The positioning device as described in claim 4, wherein the base plate comprises a first surface and a second surface opposite to the first surface, the base plate defines a receiving groove, the receiving groove extends from the first surface to the second surface, the receiving groove is configured to receive the product to be positioned.

6. The positioning device as described in claim 5, wherein the base plate defines at least one positioning groove, the at least one positioning groove extends from the second surface to the first surface, the at least one positioning groove is slidably engaged with the at least one first guide rail, the base plate is movable from the first end of the at least one first guide rail to the second end of the at least one first guide rail via the at least one positioning groove.

7. The positioning device as described in claim 2, wherein:
   the driving device comprises a supporting member and at least one resisting member; the supporting member is slidably attached to the support platform, the supporting member is moved by the support platform to move along the second guide rail and to move from the first driving device position away from the support platform to the second driving device position nearer the support platform as the support platform moves from the first end of the at least one first guide rail to the second end of the at least one first guide rail; the at least one resisting member protrudes from the supporting member, the at least one resisting member is brought by the supporting member to move the at least one pressing plate to the second latching device position holding the product to be positioned against the support platform as the supporting member moves to the second driving device position nearer the support platform.

8. The positioning device as described in claim 7, wherein:
   the driving device comprises at least one guiding member and a resisting device;

the at least one guiding member protrudes from the support platform and extends away from the support platform; and the resisting device comprises the supporting member and the at least one resisting member; the supporting member defines at least one third through hole, the at least one guiding member passes through the at least one third through hole of the supporting member.

9. The positioning device as described in claim 7, wherein:

the driving device further comprises a wheel, the wheel is fixed to the supporting member, the wheel is slidably engaged with the second guide rail, the supporting member is moved by the support platform to move along the second guide rail via the wheel.

10. The positioning device as described in claim 1, wherein the at least one first guide rail and the second guide rail are parallel with each other, the second guide rail defines a guiding groove, the guiding groove comprises a first end and a second end opposite to the first end, the guiding groove extends toward the at least one first guide rail in a horizontal surface from the first end of the guiding groove to the second end of the guiding groove, the driving device is moved by the support platform to move from the first end of the guiding groove to the second end of the guiding groove as the support platform moves from the first end of the at least one first guide rail to the second end of the at least one first guide rail.

11. The positioning device as described in claim 1, wherein the driving device further comprises a resiling member, the resiling member is arranged between the support platform and the driving device, the resiling member comprises a first end and a second end opposite to the first end, the first end of the resiling member is fixed to the support platform and the second end of the resiling member is fixed to the driving device, the resiling member is configured to resile to move the driving device to the first driving device position away from the support platform until the driving device brings the support platform to the first end of the at least one first guide rail.

12. The positioning device as described in claim 1, further comprising a limiting member, wherein the limiting member is fixed on the support, and is arranged at a side of the second end of the at least one first guide rail, the limiting member is directly opposite to the support platform, the limiting member is configured to limit a movement range of the support platform.

13. The positioning device as described in claim 12, further comprising at least one fixing device, wherein the at least one fixing device comprises a first fixing member and a second fixing member, the first fixing member is fixed to the support platform, the second fixing member is fixed to the limiting member, the second fixing member is configured to engage with the first fixing member to attract the support platform to the limiting member when the second fixing member contacts the first fixing member.

14. The positioning device as described in claim 13, wherein the second fixing member engages with the first fixing member via a magnetic force between the second fixing member and the first fixing member.

* * * * *